United States Patent [19]
Ragan

[11] Patent Number: 5,263,194
[45] Date of Patent: Nov. 16, 1993

[54] ZERO IF RADIO RECEIVER FOR INTERMITTENT OPERATION

[75] Inventor: Lawrence H. Ragan, Richardson, Tex.

[73] Assignees: Seiko Corp.; Seiko Epson Corp., Japan

[21] Appl. No.: 489,579

[22] Filed: Mar. 7, 1990

[51] Int. Cl.$^5$ .............................................. H04B 1/06
[52] U.S. Cl. .............................. 455/316; 455/234.1; 455/324
[58] Field of Search ............... 455/207–209, 455/214, 258, 264, 316–319, 324, 344, 234; 340/825.44

[56] References Cited

U.S. PATENT DOCUMENTS

| | | | |
|---|---|---|---|
| 4,476,585 | 10/1984 | Reed | 455/324 |
| 4,718,113 | 1/1988 | Rother et al. | 455/324 |
| 4,885,802 | 12/1989 | Ragan | 455/344 |

*Primary Examiner*—Reinhard J. Eisenzopf
*Assistant Examiner*—Edward Urban
*Attorney, Agent, or Firm*—Elmer Galbi

[57] ABSTRACT

A radio receiver for use with a time slot paging system which receives intermittent data includes a direct coupled zero IF receiver circuit with at least one automatic gain control (AGC) amplifier stage. DC offset errors are removed from the AGC amplifier stages by a timed zero adjustment circuit that is switched into the AGC circuit just prior to the receipt of data. The resulting zero IF circuit may be miniaturized in monolithic form making it ideal for use in a wristwatch sized pager.

2 Claims, 1 Drawing Sheet

ZERO IF RADIO RECEIVER FOR INTERMITTENT OPERATION

FIELD OF THE INVENTION

The following invention relates to radio receivers and more particularly to zero IF radio receivers for frequency modulated signals which are received on an intermittent basis.

BACKGROUND OF THE INVENTION

Zero IF receivers for radio signals are well known in the art, and are amply described in publications such as Proc. IRE 44 (1956), pages 1703-1705, and U.S. Pat. No. 2,928,055, both of which are incorporated herein by reference. In a zero IF radio receiver, a received FM or AM signal is mixed with the output of a down conversion oscillator to translate the received signal to baseband. Equal positive and negative frequency excursions about the carrier frequency result in the same deviation frequency; however, the polarity of the modulation can no longer be determined without some phase reference signal. To provide that reference signal, two substantially identical signal paths known as I+Q paths are provided in which the received signal is down converted to baseband, low pass filtered to remove the sum products of mixing as well as undesired adjacent channel signals, and up converted to an output frequency.

The down and up conversion oscillators for one path are in phase quadrature with their counterparts in the other path. When the outputs of the two paths are then summed the side bands cancel in such a manner that the modulation polarity of the original received signal is retained, though translated to a new, predetermined output frequency. In effect, the received signal is translated from an incoming frequency to baseband, filtered to remove interfering adjacent signals, and reconverted to an output frequency in which conventional FM demodulation can take place.

Receivers known as superheterodyne receivers use a different technique. A superheterodyne receiver converts an incoming radio signal to one or more intermediate frequencies in which amplification and frequency selection are more easily performed than at the frequency of the received signal. Typically, the carrier frequency of the signal is converted once or twice in successive stages for eventual demodulation. The intermediate frequency, typically a high frequency determined by the higher order spurious responses of the mixer, is selected at each stage through a band pass filter.

It is difficult to miniaturize superheterodyne receivers because high-Q crystal or ceramic band pass filters cannot be easily integrated in monolithic form. This is especially true for high frequency filters. Zero IF receivers, on the other hand, can be miniaturized because frequency selectivity is achieved through low pass filtering. Low pass filters are readily fabricated in monolithic form, especially when cutoff is at a low frequency, typically on the order of the bandwidth of the signal. Thus, zero IF receivers have the advantage of smaller size over conventional superheterodyne receivers.

Although they do have some advantages, zero IF receivers have a number of drawbacks that have heretofore limited their use. Receivers of this type typically include several high gain amplifiers typically subject to automatic gain control (AGC). This controlled amplification preserves linearity in the zero IF amplifiers so that the modulated signal is accurately recovered when the two signals are recombined. The problem is that DC offsets inherent in the amplifiers and other elements of the receiver circuit can cause the amplifiers to saturate. One recognized method for overcoming this problem is to AC couple the receiver elements to block their DC offsets. The AC coupling creates a DC notch around zero frequency that dampens the lower frequencies. The portion of the modulated signal centered around the carrier frequency is thus lost when the modulated signal is translated to the second IF frequency for detection.

For signal modulation formats such as FM and single sideband (SSB) the DC notch causes distortion since the notch frequencies contain signal information. Moreover, with automatic gain control, the rest of the signal is overamplified to compensate for the lost signal within the notch. This additional amplification also distorts the received signal. For these and other reasons, direct conversion receivers are primarily used for processing digital information such as with frequency shift keying (FSK) where loss of the modulated signal portion about zero frequency is not critical.

Several variations on the described zero IF receiver design have been tried for overcoming these drawbacks to analog use. For example, U.S. Pat. No. 4,653,117 teaches placement of amplification and limiting functions outside the dual signal paths at a non-zero intermediate frequency. Gain within the signal paths is thus intentionally avoided to prevent the need for AC coupling and the resultant partial loss and distortion of the demodulated signal. DC offsets are also minimized by the use of differential circuits in the zero IF stage. The drawback to this approach, however, is the need for additional circuitry to provide the needed gain. The use of differential amplifiers and the addition of amplifiers and limiters beyond the summing junction of the signal paths makes the receiver circuit somewhat larger and more complex to design and fabricate.

Copending patent application Ser. No. 07/229,976, now U.S. Pat. No. 4,944,025 entitled "DIRECT CONVERSION FM RADIO RECEIVER WITH OFFSET" filed Aug. 9, 1988 describes the use of an offset frequency to eliminate the notch problem. However, the use of an offset frequency imposes added requirements on the filters in the system and thus has associated disadvantages from a practical point of view.

Since an advantage of zero IF radio receivers is that they can be constructed in monolithic form, an area of practical application for such receivers is in devices which require a minimum of size and space. A paging system which uses an FM radio receiver contained in a wrist watch is shown in Gaskill, et al., U.S. Pat. No. 4,713,808. The FM receiver circuitry disclosed in the Gaskill patent operates intermittently and at a very low duty cycle. The receiver is active for about 33 milliseconds and is then inactive for about two minutes.

As stated above, it has been necessary to provide AC couplings for automatic gain control amplifiers in each signal path of a zero IF receiver due to errors created by DC offsets in the amplifiers which can lead to saturation. For some time it has been known that amplifiers may be designed which automatically compensate for such errors which are caused by drift. Such amplifiers are generally known as auto zeroing amplifiers and an example of such an amplifier is described in the May 11, 1989 issue of *Electronic Design* magazine. In amplifiers of this type a zero adjustment is made during an adjustment cycle which may be then followed by an operating cycle.

SUMMARY OF THE PRESENT INVENTION

The present invention provides a zero IF FM radio receiver for a radio pager which works on an intermittent basis. A zero IF receiver built according to the present invention includes an RF receiving section for receiving frequency modulated signals and a pair of signal paths branching from the receiver. Each path includes at least one direct coupled AGC amplifier. A zero adjustment circuit is coupled to each amplifier for removing DC offsets caused by drift. The use of such a circuit is made practical in the receivers of the present invention because, even though the receivers receive analog data, they do so only intermittently. The zero adjustment circuit may, therefore, be controlled by a timer to remove DC voltage offsets from the automatic gain control amplifiers in each signal path only during the quiescent period between receptions of data. The data is received in short packets with a fairly long period of time between packets, thereby creating a very low duty cycle. The automatic zero adjustment circuits may be activated just prior to the receipt of a data packet to remove DC offsets and other errors that have accumulated during the time since the last reception of a packet.

In all other respects, the receiver is similar to a conventional zero IF receiver having a pair of signal paths coupled to an oscillator for down converting the FM carrier signal to a baseband FM signal in each signal path. The automatic gain control amplifiers amplify the FM baseband signal in each respective signal path before they are recombined at a summing junction. Through the use of the zero adjustment circuitry, a zero IF receiver for a wrist watch sized paging system may be constructed in monolithic form without the disadvantages inherent in prior designs.

It is a principal object of this invention to provide a zero IF radio receiver for a time slot pager having miniaturized radio receiving circuitry.

Another object of the invention is to provide a zero IF radio receiver which may be constructed in monolithic form and which would be free from amplifier saturation caused by drift.

Yet a further object of this invention is the incorporation of automatic zeroing circuitry in the AGC amplifiers of a zero IF receiver to eliminate saturation.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
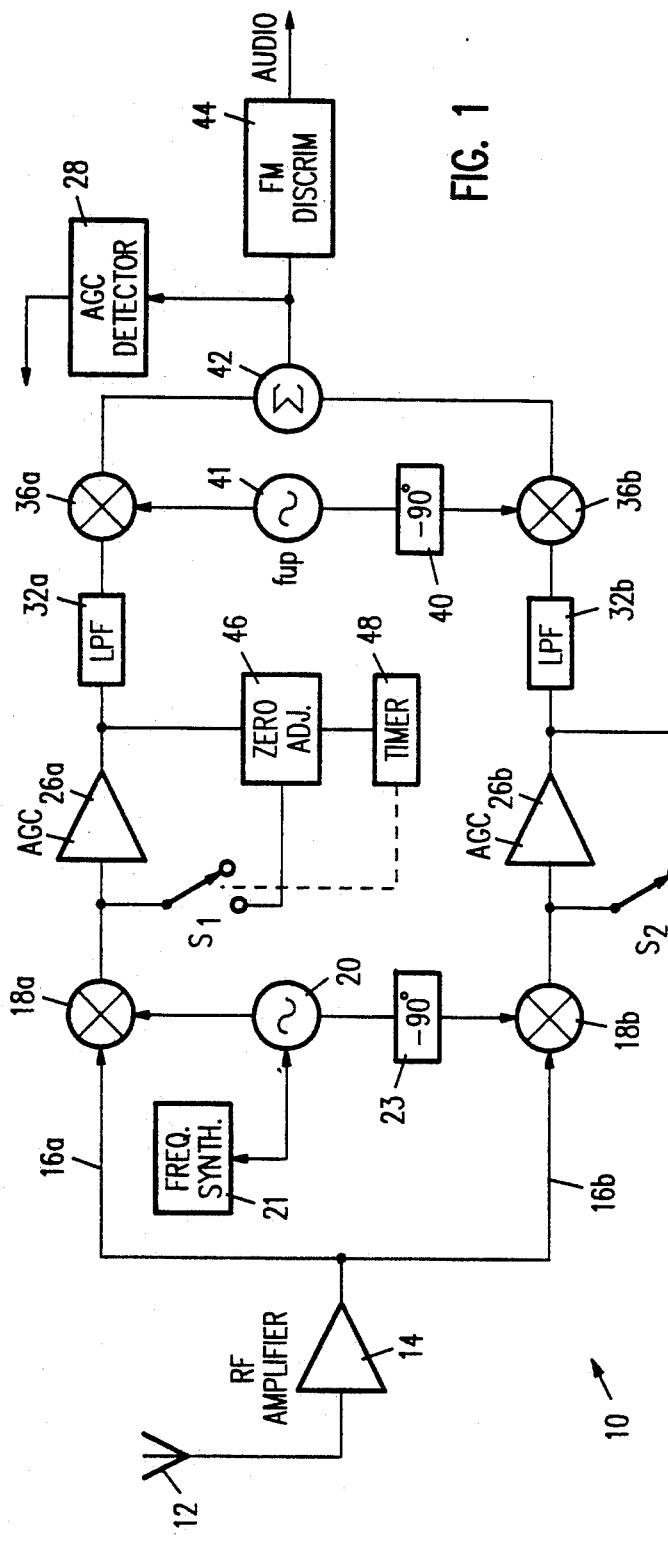
FIG. 1 is a block schematic diagram of the zero IF FM receiver constructed according to the present invention.

A zero IF radio receiver 10 includes an antenna 12 coupled to RF amplifier 14. The output of the RF amplifier 14 branches into two signal paths 16a and 16b which are coupled to mixers 18a and 18b, respectively. The other input to mixers 18a and 18b originates at an oscillator 20 which is a down conversion oscillator whose oscillator frequency is nearly equal to the carrier frequency of the RF signal amplified in amplifier 14. The oscillator 20 is capable of being tuned or controlled over a desired band of frequencies by a conventional frequency synthesizer 21. The oscillator frequency is supplied to path 16b at mixer 18b in quadrature to path 16a by using a phase shifter 23 to shift the phase of the output of oscillator 20 by 90°. The outputs of mixers 18a and 18b are routed to the summing junctions of automatic gain control amplifiers 26a and 26b, respectively. Automatic gain control for the amplifiers 26a and 26b is provided by an AGC detector 28 which is coupled to the input of an FM detector 44.

Low pass filters 32a and 32b are coupled to the outputs of amplifiers 26a and 26b, respectively. Although shown as a single amplifier-filter combination, typically these components are multistage amplifiers with filters distributed between stages. The outputs of the low pass filters are connected to mixers 36a and 36b, which receive an up conversion frequency signal generated by a local oscillator 41. Mixer 36b receives the up conversion frequency shifted 90° by phase shifter 40. The outputs of the two mixers 36a and 36b are combined at a summing junction 42 which forms the input to the FM discriminator 44.

A pair of zero adjustment circuits 46 and 48 respectively are connected across AGC amplifiers 26a and 26b, respectively, through switches S1 and S2. A pair of timers 48 and 50 are connected to zero adjust circuits 46 and 48, respectively, and the dashed lines leading to switches S1 and S2 are intended to indicate that the timers 48 and 50 are responsible for opening and closing switches S1 and S2 at appropriate times.

The zero adjust circuits 46 and 48 may be of the type described in the May 11, 1989 issue of *Electronic Design* magazine in an article entitled, "Super Op Amp Flaunts Speed Precision Mix." The circuit described in this article utilizes a digital-to-analog converter to supply an auto zeroing input to an operational amplifier to maintain DC offset voltages at a very low level. This type of circuit lends itself to construction in monolithic form and is thus well suited for the application of the receiver 10 which is intended to be used in a wrist watch sized pager.

The zero adjust circuits 46 and 48 do not operate continuously in the radio receiver 10 but are switched into the circuit at appropriate times through switches S1 and S2 under the control of timers 48 and 50. The timers 48 and 50 may be conventional clock circuits which send a signal to close switches S1 and S2 for a brief period of time while the receiver 10 is in quiescent state. The receiver 10 is in use intermittently because it is intended to be used with a paging system in which packets of data are transmitted from a central station at a very low duty cycle. The data may be transmitted in a burst lasting only several tens of milliseconds, and then the receiver may enter an quiescent mode for several minutes. During this quiescent period the timers 48 and 50 generate a signal that closes switches S1 and S2 so that the automatic gain control amplifiers 26a and 26b can be zeroed. Preferably, the timers 48 and 50 are adjusted to provide the switch closure just prior to the receipt of a data packet by the receiver 10. In this way the errors that may accumulate in the circuit over the long quiescent period in between data packets may be removed as close as possible to the point in time where a new data packet is to be received. The intermittent nature of the reception by receiver 10 makes this type of zero adjust circuit practical even with analog data because accumulated errors need only be removed just before the receipt of data, and the amplifiers do not have to be constantly adjusted to remove DC offset voltages.

Figure 3:
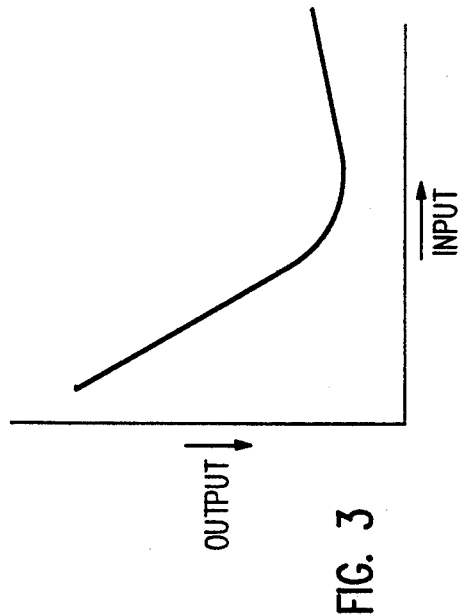
FIG. 3 is a graphical representation of the effect of DC offset errors that can be generated in multi stage automatic gain control amplifiers.
Figure 2:
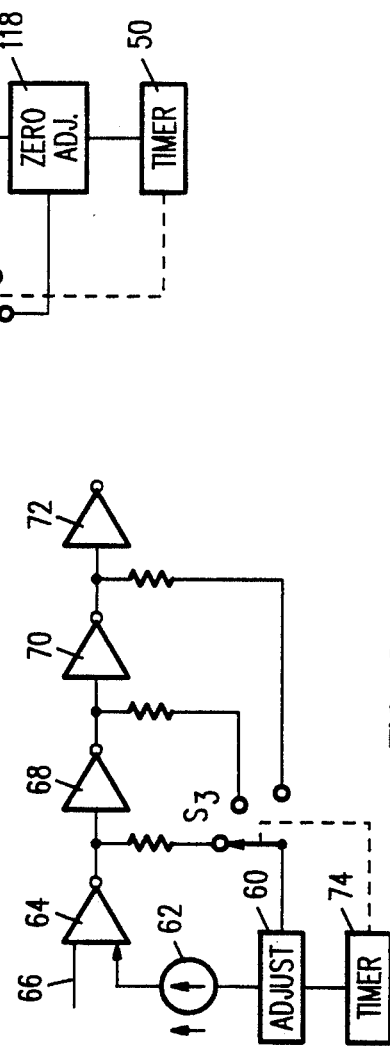
FIG. 2 is a schematic diagram of a multi-stage automatic gain control amplifier utilizing the zero adjustment feature of the present invention.

A variation of the automatic gain control amplifier circuitry is shown in FIG. 2. While the circuit of FIG. 1 shows only one automatic gain control amplifier in each path, typically these amplifiers are cascaded in stages. The effect of saturation of a single stage is shown in the graph in FIG. 3. These amplifiers are inverting linear amplifiers, but saturation causes their outputs to rise. In order to remove these errors, the zero adjustment feature is sequenced through each of the stages. A zero adjust circuit 60 is coupled through a current source 62 to an amplifier 64. The amplifier 64 also has a data path input 66 and has an output which is coupled to an amplifier 68. The amplifier 68 is in turn coupled to an amplifier 70 whose output is connected to an amplifier 72. The zero adjust circuit 60 is connected in sequence by switch S3 which is under the control of timer 74. Just before the receipt of a data packet, the timer 74 sequences through amplifiers 64, 68, 70 and 72 beginning with amplifier 64. In this way upstream errors are eliminated first so that their outputs do not introduce errors into the downstream amplifiers during the auto zeroing sequence.

The invention described herein is particularly adaptable for use with a miniaturized intermittent radio receiver such as that which might be used for a time slot paging system. The circuits can be constructed in monolithic form, and complex frequency shifting techniques or elaborate filters are unnecessary due to the direct coupled nature of the zero IF receiver. Errors in saturation resulting from DC offsets are avoided by the timed zero adjustment circuits which automatically zero the automatic gain control amplifiers at times which are just prior to the receipt of data.

In the zero IF circuit of the invention, modifications may be made without departing from the spirit of invention. For example, while the invention has been shown in the context of FM circuitry it is equally useful for other types of modulation such as AM. Also, while the amplifiers shown in FIG. 1 are AGC amplifiers, the auto-zeroing technique of the invention is applicable to other amplifier designs that do not use automatic gain control. Additionally, the circuit of FIG. 1 may be modified by substituting an oscillator having twice the injection frequency and a divide-by-two divider in place of oscillator 20 and phase shifter 23.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A zero IF receiver for processing radio signals that are modulated on a carrier signal comprising:
    (a) RF means for receiving the radio signals;
    (b) zero IF down conversion means for converting said radio signals to near zero IF signals;
    (c) direct coupled amplifier means coupled to said zero IF down conversion means for providing gain to said near zero IF signal; and
    (d) zero adjustment means coupled to said amplifier means for removing DC voltage offsets;
    said direct coupled amplifier means comprising a plurality of amplifier stages and further including switching means for sequentially coupling said zero adjustment means to each of said amplifier stages in turn.

2. The zero IF amplifier of claim 11 wherein said switching means couples said zero adjust means to each of said amplifiers in a predetermined sequence, said sequence starting with an amplifier stage coupled to said zero IF down conversion means and proceeding through each stage to a final stage.

* * * * *